(12) United States Patent
Kamatani et al.

(10) Patent No.: US 8,996,223 B2
(45) Date of Patent: Mar. 31, 2015

(54) ENGINE OPERATION START CONTROL DEVICE OF HYBRID VEHICLE

(75) Inventors: Hideki Kamatani, Nagoya (JP); Kenta Watanabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/372,062

(22) PCT Filed: Jan. 19, 2012

(86) PCT No.: PCT/JP2012/051027
§ 371 (c)(1),
(2), (4) Date: Jul. 14, 2014

(87) PCT Pub. No.: WO2013/108385
PCT Pub. Date: Jul. 25, 2013

(65) Prior Publication Data
US 2014/0358351 A1 Dec. 4, 2014

(51) Int. Cl.
*B60L 9/00* (2006.01)
*B60W 10/06* (2006.01)
*B60W 40/105* (2012.01)

(52) U.S. Cl.
CPC ............. *B60W 10/06* (2013.01); *B60W 40/105* (2013.01); *Y10S 903/903* (2013.01); *Y10S 903/918* (2013.01)
USPC ............. 701/22; 701/112; 701/113; 701/102; 701/54; 701/58; 701/70; 903/903; 903/918; 180/292; 180/293; 180/294; 180/65.31; 180/65.21

(58) Field of Classification Search
CPC ...... Y02T 10/48; Y02T 10/6221; Y02T 10/18; Y02T 10/42; Y02T 10/6217; Y02T 10/70; Y02T 10/7077; F02D 17/02; F02D 41/042; F02D 41/26; F02N 11/0818; F02N 11/0822; F02N 2200/0802; F02N 2300/102
USPC ................. 701/112, 113, 102, 22, 54, 58, 70; 903/93, 908
See application file for complete search history.

(56) References Cited

U.S. PATENT DOCUMENTS 6,275,759 B1 * 8/2001 Nakajima et al. ............... 701/54
6,358,180 B1 * 3/2002 Kuroda et al. .................... 477/4
(Continued)

FOREIGN PATENT DOCUMENTS

JP       11-117840 A      4/1999
JP      2000-204999 A      7/2000
(Continued)

*Primary Examiner* — Redhwan k Mawari
(74) *Attorney, Agent, or Firm* — Kenyon & Kenyon LLP

(57) ABSTRACT

The invention relates to an engine operation start control device of a hybrid vehicle comprising a power output device having an internal combustion engine and an electric motor. In this hybrid vehicle, an intermittent control for intermittently operating the engine can be performed and when the operation of the engine is started during the intermittent control being performed, a cranking of the engine is performed until the engine speed reaches a target engine speed. According to the invention, in case that the operation of the engine is started when the speed of the hybrid vehicle is higher than or equal to a predetermined speed and a power required for the power output device is larger than or equal to a predetermined power, the engine speed, which increases as the speed of the hybrid vehicle increases, is set as the target engine speed.

4 Claims, 6 Drawing Sheets

(56) References Cited

U.S. PATENT DOCUMENTS

| | | | |
|---|---|---|---|
| 6,926,639 B2 * | 8/2005 | Hopper | 477/110 |
| 7,617,896 B2 * | 11/2009 | Ogata | 180/65.7 |
| 7,860,636 B2 * | 12/2010 | Yamaguchi | 701/112 |
| 8,442,747 B2 * | 5/2013 | Ma et al. | 701/112 |
| 8,543,318 B2 * | 9/2013 | Ma et al. | 701/112 |
| 8,892,339 B2 * | 11/2014 | Ma et al. | 701/113 |

FOREIGN PATENT DOCUMENTS

| | | |
|---|---|---|
| JP | 2000-274273 A | 10/2000 |
| JP | 2009-214704 A | 9/2009 |
| JP | 2009-227227 A | 10/2009 |
| JP | 2010-070008 A | 4/2010 |
| JP | 2010-111144 A | 5/2010 |

* cited by examiner

ENGINE OPERATION START CONTROL DEVICE OF HYBRID VEHICLE

CROSS-REFERENCE TO RELATED APPLICATIONS

This is a national phase application based on the PCT International Patent Application No. PCT/JP2012/051027 filed Jan. 19, 2012, the entire contents of which are incorporated herein by reference.

TECHNICAL FIELD

The invention relates to an engine operation start control device of a hybrid vehicle.

BACKGROUND ART

A hybrid vehicle comprising a power output device having an internal combustion engine and an electric motor is described in the Patent Literature 1. In this hybrid vehicle, when the engine operation start (that is, the start of the operation of the engine) is required, the engine is cranked by inputting a torque from the electric motor to an engine output shaft (that is, an output shaft of the engine).

CITATION LIST

Patent Literature

[PATENT LITERATURE 1] Unexamined JP Patent Publication No. 11-117840
[PATENT LITERATURE 2] Unexamined JP Patent Publication No. 2010-70008
[PATENT LITERATURE 3] Unexamined JP Patent Publication No. 2009-227277
[PATENT LITERATURE 4] Unexamined JP Patent Publication No. 2000-204999

SUMMARY OF INVENTION

Problem to be Solved

In the hybrid vehicle, an intermittent control for intermittently operating the engine can be performed. While the intermittent control is performed, the engine operation (that is, the operation of the engine) may be stopped at a high vehicle speed (that is, when the speed of the hybrid vehicle is high). In case that while the engine operation is stopped (that is, the operation of the engine is stopped) at the high vehicle speed, for example, when a required power (that is, a power required as a power output from the power output device) increases and as a result, the engine operation start is required, if the engine cranking is terminated when the engine speed reaches a constant target engine speed independently of the vehicle speed (that is, the speed of the hybrid vehicle) and the required power, the engine cranking may be terminated before the engine speed increases sufficiently and thus, an acceleration property desired as the acceleration property of the hybrid vehicle may not be obtained.

The object of the invention of this application is to ensure the high acceleration property of the hybrid vehicle when the engine operation is started during the intermittent control being performed in the hybrid vehicle.

Means for Solving the Problem

The invention of this application relates to an engine operation start control device of a hybrid vehicle comprising a power output device having an internal combustion engine and an electric motor. In the hybrid vehicle of the invention, an intermittent control for intermittently operating the engine can be performed and a cranking of the engine is performed until the engine speed reaches a target engine speed when the engine operation is started during the intermittent control being performed. In this regard, according to the invention, in case that the engine operation is started when the speed of the hybrid vehicle is higher than or equal to a predetermined speed and the power required for the power output device is larger than or equal to a predetermined power during the intermittent control is performed, the engine speed, which increases as the speed of the hybrid vehicle increases, is set as the target engine speed.

According to the invention, the following effect can be obtained. That is, in the hybrid vehicle of the invention, the engine cranking for starting the engine operation during the intermittent control being performed is performed until the engine speed reaches the target engine speed. In this regard, in case that a constant engine speed independently of the vehicle speed and the required power is set as the target engine speed when the required power increases while the engine operation is stopped at the high vehicle speed and as a result, the engine is cranked for starting the engine operation, the engine cranking may be terminated before the engine speed increases sufficiently and thus, an acceleration property desired as the acceleration property of the hybrid vehicle may not be obtained. However, according to the invention, when the vehicle speed is high (that is, the vehicle speed is higher than or equal to the predetermined speed) and the required power is large (that is, the required power is larger than or equal to the predetermined power), the engine speed, which increases as the vehicle speed increases, is set as the target engine speed. Therefore, even when the vehicle speed is high and the required power is large, the engine cranking is continued until the engine speed increases sufficiently. Thus, according to the invention, the effect that the high acceleration property of the hybrid vehicle is ensured in the engine operation start when the vehicle speed is high and the required power is large can be obtained.

Further, in the aforementioned invention, when referring to the predetermined speed as first speed and referring to the predetermined power as first power, according to another invention of this application, in case that the engine operation is started when the speed of the hybrid vehicle is higher than or equal to a predetermined second speed and the power required for the power output device is larger than or equal to a predetermined second power during the intermittent control being performed, the torque input to an output shaft of the engine for cranking the engine is controlled depending on the required power.

According to this invention, the following effect can be obtained. That is, in order to ensure the high acceleration property of the hybrid vehicle when the vehicle speed is high and the required power is large, it is preferred that the engine speed reaches target engine speed rapidly as possible. According to this invention, when the vehicle speed is high (that is, the vehicle speed is higher than or equal to the second speed) and the required power is large (that is, the required power is larger than or equal to the second power), the torque input to the output shaft of the engine for cranking the engine is controlled depending on the required power. Thereby, the engine speed can reach the target engine speed rapidly by appropriately controlling the torque input to the output shaft of the engine depending on the required power. Thus, according to this invention, in the engine operation start when the vehicle speed is high and the required power is large, the effect that the further high acceleration property of the hybrid vehicle is ensured can be obtained.

It should be noted that in this invention, the second speed may be equal to or different from the first speed. Further, the second power may be equal to or different from the first power.

Further, in the aforementioned invention, as the torque applied to the output shaft of the engine for cranking the engine, the torque output from the electric motor may be employed.

Further, in the aforementioned invention, after the engine speed becomes higher than the target engine speed when the engine operation is started during the intermittent control being performed, the torque applied to the output shaft of the engine for cranking the engine may be gradually decreased.

Further, in the aforementioned invention, when the operation of the engine is stopped during the intermittent control being performed, the engine speed may be maintained at zero or generally zero.

MODE FOR CARRYING OUT THE INVENTION

Figure 1:
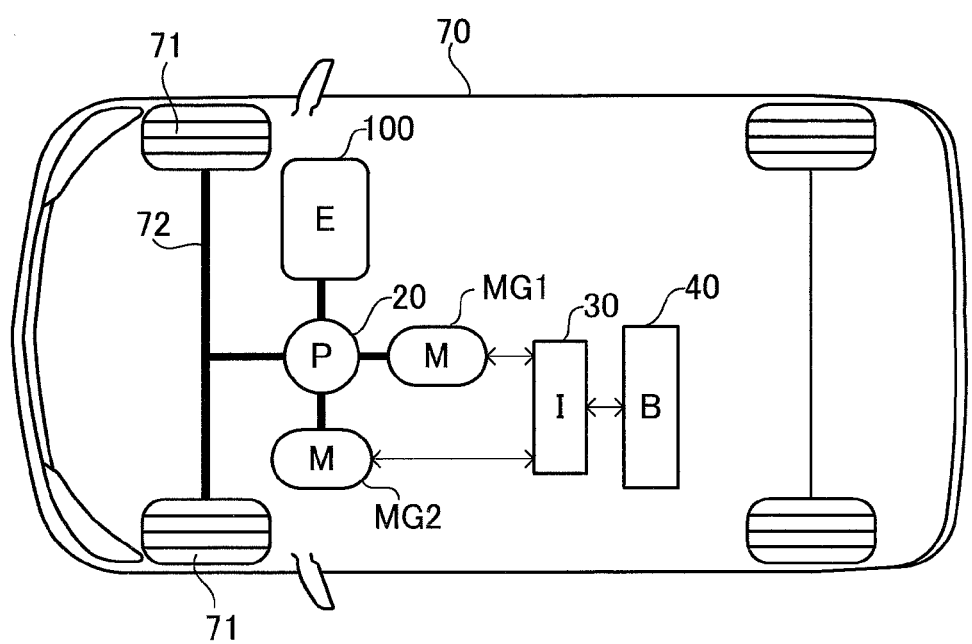
FIG. 1 is a view showing a hybrid vehicle comprising an engine operation start control device according to the first embodiment.

Next, embodiments of the invention will be described. A hybrid vehicle comprising an engine operation start control device according to one embodiment of the invention (hereinafter, this embodiment will be referred to as "first embodiment") is shown in FIG. 1. In FIG. 1, 10 denotes an internal combustion engine, 20 denotes a power distribution device, 30 denotes an inverter, 40 denotes a battery, 70 denotes a hybrid vehicle, 71 denotes drive wheels, 72 denotes a drive shaft and MG1 and MG2 denote motor generators.

The power distribution device 20 is connected to the engine 10, the motor generator MG1 (hereinafter, this motor generator will be referred to as "first motor generator"), the motor generator MG2 (hereinafter, this motor generator will be referred to as "second motor generator") and the drive shaft 72. In detail, the power distribution device 20 is constituted by a planetary gear train and a sun gear thereof is connected to an output shaft (that is, a crank shaft) of the engine 10, planetary gears thereof are connected to an input/output shaft of the first motor generator MG1 and a ring gear thereof is connected to an input/output shaft of the second motor generator MG2 and the drive shaft 72.

The power distribution device 20 can output a power, which is input thereto from the engine 10, to one or two or all of the drive shaft 72, the first motor generator MG1 and the second motor generator MG2. Further, the power distribution device 20 can output a power, which is input thereto from the first motor generator MG1, to one or two or all of the drive shaft 72, the engine 10 and the second motor generator MG2. Furthermore, the power distribution device 20 can output a power, which is input thereto from the second motor generator MG2, to one or two or all of the drive shaft 72, the engine 10 and the first motor generator MG1. Further, the power distribution device 20 can output a power, which is input thereto from the drive shaft 72, to one or two or all of the engine 10, the first motor generator MG1 and the second motor generator MG2.

As described above, the engine 10 is connected to the power distribution device 20. When the engine 10 is operated, the engine 10 outputs a power to the power distribution device 20.

As described above, the first motor generator MG1 is connected to the power distribution device 20 and is connected to the battery 40 via the inverter 30. When an electric power is supplied from the battery 40 to the first motor generator MG1, the first motor generator MG1 is driven by this electric power and then, outputs a power to the power distribution device 20. At this time, the first motor generator MG1 functions as an electric motor. On the other hand, when the power is input to the first motor generator MG1 via the power distribution device 20, the first motor generator MG1 is driven by this power and generates an electric power. At this time, the first motor generator MG1 functions as an electric generator. It should be noted that the electric power generated by the first motor generator MG1 is charged in the battery 40 via the inverter 30.

As described above, the second motor generator MG2 is connected to the power distribution device 20 and is connected to the battery 40 via the inverter 30. When the electric power is supplied from the battery 40 to the second motor generator MG2, the second motor generator MG2 is driven by this electric power and then, outputs a power to the power distribution device 20. At this time, the second motor generator MG2 functions as an electric motor. On the other hand, when the power is input to the second motor generator MG2 via the power distribution device 20, the second motor generator MG2 is driven by this power and generates an electric power. At this time, the second motor generator MG2 functions as an electric generator. It should be noted that the electric power generated by the second motor generator MG2 is charged in the battery 40 via the inverter 30.

Next, an engine operation start control during an intermittent control being performed according to the first embodiment will be described. In the following description, "engine operation start" means—start of the operation of the engine— and "power output device" means—device for outputing a power to the drive shaft—and the power output device according to the first embodiment is generally constituted by the engine, the first motor generator, the second motor generator and the power distribution device. Further, in the following description, "engine output shaft" means—output shaft of the engine—, "engine speed" means—speed of the engine—, "vehicle speed" means—speed of the hybrid vehicle—and "required power" means—power required as a power output from the power output device to the drive shaft—.

In the hybrid vehicle according to the first embodiment, the intermittent control for intermittently operating the engine can be performed. When the engine operation start is required during the intermittent control being performed, the engine is cranked by inputting a torque from the first motor generator to the engine output shaft. Then, this cranking of the engine is continued until the engine speed reaches the target engine speed. In this regard, according to the first embodiment, when the engine operation start is required during the intermittent control being performed, in case that the vehicle speed is higher than or equal to a predetermined vehicle speed and the required power is larger than or equal to a predetermined power, the engine speed, which increases as the vehicle speed increases, is set as the target engine speed.

According to the first embodiment, the following effect can be obtained. That is, in the hybrid vehicle according to the first embodiment, the engine cranking (that is, the cranking of the engine) for starting the engine operation during the intermittent control being performed is performed until the engine speed reaches the target engine speed. In this regard, in case that while the vehicle speed is high and the engine operation is stopped (that is, the engine operation is stopped under the condition that the speed of the hybrid vehicle is high), the required power increases and as a result, the engine cranking is performed for starting the engine operation, if a constant engine speed independently of the vehicle speed and the required power is set as the target engine speed, the engine cranking may be terminated before the engine speed increases sufficiently and thus, an acceleration property desired as the acceleration property of the hybrid vehicle may not be obtained. However, according to the first embodiment, when the vehicle speed is high (that is, the vehicle speed is higher than or equal to the predetermined vehicle speed) and the required power is large (that is, the required power is larger than or equal to the predetermined power), the engine speed, which increases as the vehicle speed increases, is set as the target engine speed. Therefore, even when the vehicle speed is high and the required power is large, the engine cranking is continued until the engine speed increases sufficiently. Thus, according to the first embodiment, in the engine operation start when the vehicle speed is high and the required power is large, the effect that the high acceleration property of the hybrid vehicle is ensured can be obtained.

It should be noted that according to the first embodiment, the relatively high vehicle speed and the relatively large power, in which it should be judged that there is a large necessity that the target engine speed should be set depending on the vehicle speed in order to ensure the high acceleration property of the hybrid vehicle, are set as the predetermined vehicle speed and power, respectively.

Further, in the engine operation start control during the intermittent control being performed according to the first embodiment, when the engine operation start is required during the intermittent control being performed and the vehicle speed is not higher than or equal to the predetermined vehicle speed or the required power is not larger than or equal to the predetermined power, for example, a predetermined constant engine speed independently of the vehicle speed is set as the target engine speed.

Further, in the engine operation start control during the intermittent control being performed according to the first embodiment, for example, an engine input torque (that is, a torque input from the first motor generator to the engine output shaft) determined depending on an engine water temperature (that is, a temperature of a cooling water for cooling the engine) or a predetermined constant engine input torque independently of the engine water temperature is set as a target value of the engine input torque for cranking the engine (that is, a target value of the engine input torque when the engine is cranked). Further, in the engine operation start control during the intermittent control being performed according to the first embodiment, after the engine speed becomes higher than the target engine speed while the engine is cranked, the target engine input torque is gradually decreased.

Further, in the engine operation start control during the intermittent control being performed according to the first embodiment, as the condition that the target engine speed is set depending on the vehicle speed, a condition that the engine water temperature is higher than or equal to a predetermined temperature may be added. That is, in this case, when the engine operation start is required during the intermittent control being performed, the vehicle speed is higher than or equal to the predetermined vehicle speed, the required power is larger than or equal to the predetermined power and the engine water temperature is higher than or equal to the predetermined temperature, the engine speed, which increases as the vehicle speed increases, is set as the target engine speed.

Further, in the hybrid vehicle of the first embodiment, in case that there is a region of the engine speed where a torsional resonance occurs between the first motor generator and the engine (hereinafter, this region will be referred to as "resonance band"), in the engine operation start control during the intermittent control being performed according to the first embodiment, as the condition that the engine speed determined depending on the vehicle speed is set as the target engine speed, a condition that the engine speed exceeds the resonance band may be added. That is, in this case, when the engine operation start is required during the intermittent control being performed, the vehicle speed is higher than or equal to the predetermined vehicle speed, the required power is larger than or equal to the predetermine power and the engine speed exceeds the resonance band, the engine speed, which increases as the vehicle speed increases, is set as the target engine speed.

Figure 2:
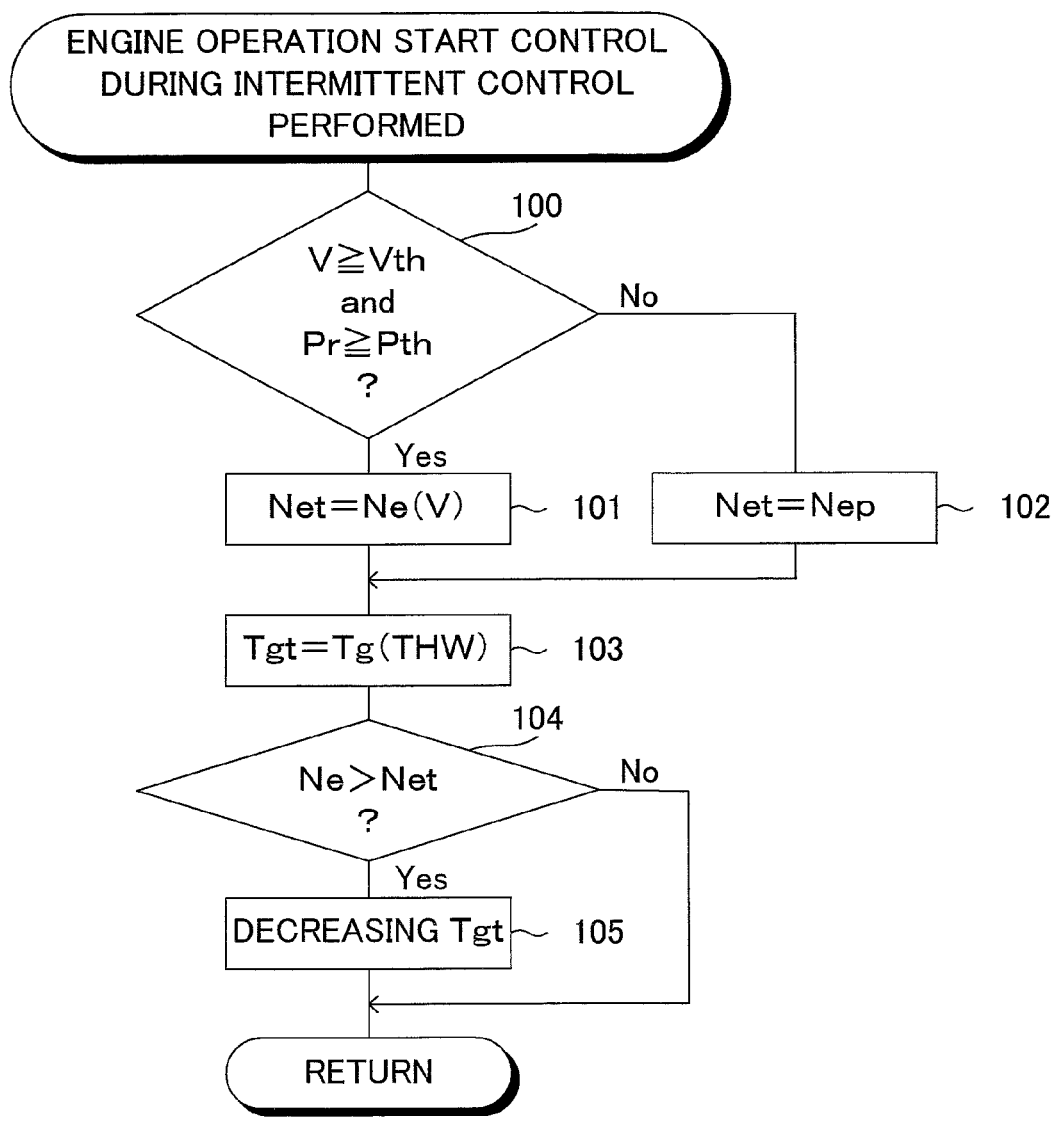
FIG. 2 is a view showing an example of a routine for performing an engine operation start control during an intermittent control being performed according to the first embodiment.

Next, an example of a routine for performing the engine operation start control during the intermittent control being performed according to the first embodiment will be described. This example of the routine is shown in FIG. 2. It should be noted that this routine starts when the engine operation start is required during the intermittent control being performed and thereafter, is repeatedly performed at predetermined time intervals until the cranking of the engine is completed (that is, until the engine input torque becomes zero).

When the routine of FIG. 2 starts, first, at step 100, it is judged if the present vehicle speed V is higher than or equal to a predetermined vehicle speed Vth (V≥Vth) and the present required power Pr is larger than or equal to a predetermined Pth (Pr≥Pth). In this regard, when it is judged that V≥Vth and Pr≥Pth, the routine proceeds to the step 101. On the other hand, it is not judged that V≥Vth and Pr≥Pth, the routine proceeds to the step 102.

At the step 101, the engine speed Ne(V) determined depending on the present vehicle speed V is set as the target engine speed Net and then, the routine proceeds to the step 103. In particular, at the step 101, the engine speed, which increases as the present vehicle speed V increases, is set as the target engine speed Net and then, the routine proceeds to the step 103. On the other hand, at the step 102, a predetermined constant engine speed Nep independently of the present vehicle speed V is set as the target engine speed Net and then, the routine proceeds to the step 103.

At the step 103, the engine input torque Tg(THW) determined depending on the present engine water temperature THW is set as the target engine input torque (that is, a torque to be input from the first motor generator to the engine output shaft for cranking the engine) Tgt. Thereby, the torque determined depending on the present engine water temperature is input from the first motor generator to the engine output shaft and the cranking of the engine starts. Next, at the step 104, in case that the routine proceeds to the step 104 through the step 101, it is judged if the engine speed Ne is higher than the target engine speed Net set at the step 101 (Ne>Net) and on the other hand, in case that the routine proceeds to the step 104 through the step 102, the engine speed Ne is higher than the target engine speed Net set at the step 102 (Ne>Net). In this regard, when it is judged that Ne>Net, the routine proceeds to the step 105 where the target engine input torque Tgt is decreased by a constant value and thereafter, the routine ends. On the other hand, it is not judged that Ne>Net, the routine ends.

Next, the second embodiment will be described. It should be noted that the configuration and the control according to the second embodiment which are not described below are the same as those according to the first embodiment, respectively or those derived from those according to the first embodiment in consideration of those according to the second embodiment, which will be described below. Further, the second embodiment may be combined with the first embodiment within the consistent range.

In the engine operation start control during the intermittent control being performed according to the second embodiment, similar to the first embodiment, when the engine operation start is required during the intermittent control being performed, the engine is cranked by inputting the torque from the first motor generator to the engine output shaft. Then, this cranking of the engine is continued until the engine speed reaches the target engine speed. In this regard, according to the second embodiment, similar to the first embodiment, when the vehicle speed is higher than or equal to the predetermined vehicle speed and the required power is larger than or equal to the predetermined power, the engine speed, which increases as the vehicle speed increases, is set as the target engine speed. On the other hand, in the engine operation start control during the intermittent control being performed according to the second embodiment, contrast to the first embodiment, when the vehicle speed is higher than or equal to the predetermined vehicle speed and the required power is larger than or equal to the predetermined power, the engine input torque determined depending on the required power is set as the target engine input torque. That is, the engine input torque is controlled depending on the required power.

According to the second embodiment, the following effect can be obtained. That is, according to the second embodiment, when the vehicle speed is high (that is, the vehicle speed is higher than or equal to the predetermined vehicle speed) and the required power is large (that is, the required power is larger than or equal to the predetermined power), the engine speed is increased to the relatively high engine speed by the engine cranking in order to ensure the high acceleration property of the hybrid vehicle. At this time, in order to ensure the further high acceleration property of hybrid vehicle, it is preferred that the engine speed reaches the target engine speed rapidly as possible. According to the second embodiment, when the vehicle speed is high (that is, the vehicle speed is higher than or equal to the predetermined vehicle speed) and the required power is large (that is, the required power is larger than or equal to the predetermined power), the target engine input torque is set depending on the required power. Thereby, the engine speed reaches the target engine speed more rapidly by appropriately setting the target engine input torque depending on the required power. Thus, according to the second embodiment, in the engine operation start when the vehicle speed is high and the required power is large, the effect that the further high acceleration property of the hybrid vehicle is ensured can be obtained.

It should be noted that according to the second embodiment, the relatively high vehicle speed and the relatively large power, in which there is a large necessity that the target engine speed should be set depending on the vehicle speed in order to ensure the high acceleration property of the hybrid vehicle, are set as the predetermined vehicle speed and power, respectively or the relatively high vehicle speed and the relatively large power, in which there is a large necessity that the target engine input torque should be set depending on the required power in order to ensure the further high acceleration property of the hybrid vehicle, are set as the predetermined vehicle speed and power, respectively.

Further, in the engine operation start control during the intermittent control being performed according to the second embodiment, the engine input torque determined depending on the required power is preferably one which increases as the required power increases.

Furthermore, according to the second embodiment, when the engine operation start is required during the intermittent control being performed, the vehicle speed is not higher than or equal to the predetermined vehicle speed or the required power is not larger than or equal to the predetermined power, for example, the engine input torque determined depending on the engine water temperature and independently of the required power is set as the target engine input torque.

Figure 3:
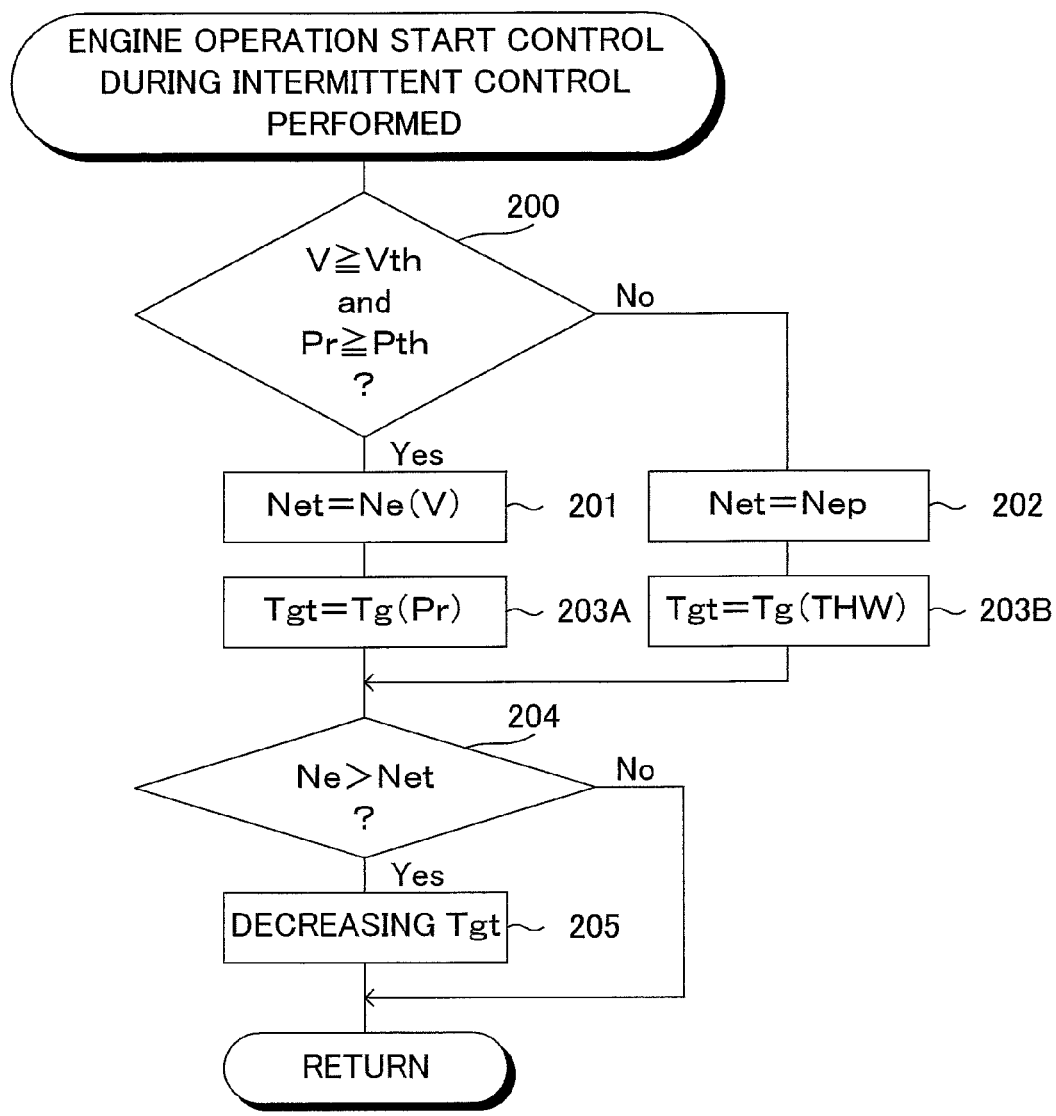
FIG. 3 is a view showing an example of a routine for performing the engine operation start control during an intermittent control being performed according to the second embodiment.

Next, an example of a routine for performing the engine operation start control during the intermittent control being performed according to the second embodiment will be described. This example of the routine is shown in FIG. 3. It should be noted that this routine starts when the engine operation start is required during the intermittent control being performed and thereafter, is repeatedly performed at predetermined time intervals until the cranking of the engine is completed (that is, until the engine input torque becomes zero).

When the routine of FIG. 3 starts, first, at step 200, it is judged if the present vehicle speed V is higher than or equal to a predetermined vehicle speed Vth (V≥Vth) and the present required power Pr is larger than or equal to a predetermined power Pth (Pr≥Pth). In this regard, when it is judged that V≥Vth and Pr≥Pth, the routine proceeds to the step 201. On the other hand, when it is not judged that V≥Vth and Pr≥Pth, the routine proceeds to the step 202.

At the step 201, the engine speed Ne(V) determined depending on the present vehicle speed V is set as the target engine speed Net and then, the routine proceeds to the step 203A. In particular, at the step 201, the engine speed, which increases as the present vehicle speed V increases, is set as the target engine speed Net and then, the routine proceeds to the step 203A. On the other hand, at the step 202, a predetermined constant engine speed Nep independently of the present vehicle speed V is set as the target engine speed Net and then, the routine proceeds to the step 203B.

At the step 203A, the engine input torque Tg(Pr) determined depending on the present required power Pr is set as the target engine input torque Tgt and then, the routine proceeds to the step 204. Thereby, the torque determined depending on the present required power is input from the first motor generator to the engine output shaft and the cranking of the engine starts. On the other hand, at the step 203B, the engine input torque Tg(THW) determined depending on the present engine water temperature THW is set as the target engine input torque Tgt. Thereby, the torque determined depending on the present engine water temperature is input from the first motor generator to the engine output shaft and the cranking of the engine starts. Next, at the step 204, in case that the routine proceeds to the step 204 through the step 201, it is judged if the engine speed Ne is higher than the target engine speed Net set at the step 201 (Ne>Net) and on the other hand, in case that the routine proceeds to the step 204 through the step 202, the engine speed Ne is higher than the target engine speed Net set at the step 202 (Ne>Net). In this regard, when it is judged that Ne>Net, the routine proceeds to the step 205 where the target engine input torque Tgt is decreased by a constant value and thereafter, the routine ends. On the other hand, it is not judged that Ne>Net, the routine ends.

It should be noted that in the engine operation start control during the intermittent control being performed according to the second embodiment, as the condition that the engine speed determined depending on the vehicle speed is set as the target engine speed and the engine input torque determined depending on the required power is set as the target engine input torque, a condition that the engine water temperature is higher than or equal to a predetermined temperature may be added. That is, in this case, when the engine operation start is required during the intermittent control being performed, the vehicle speed is higher than or equal to the predetermined vehicle speed, the required power is larger than or equal to the predetermined power and the engine water temperature is higher than or equal to the predetermined temperature, the engine speed, which increases as the vehicle speed increases, is set as the target engine speed and the engine input torque determined depending on the required power is set as the target engine input torque.

Further, in the hybrid vehicle of the second embodiment, in case that there is the resonance band between the first motor generator and the engine, in the engine operation start control during the intermittent control being performed according to the second embodiment, as the condition that the engine speed determined depending on the vehicle speed is set as the target engine speed and the engine input torque determined depending on the required power is set as the target engine input torque, a condition that the engine speed exceeds the resonance band may be added. That is, in this case, when the engine operation start is required during the intermittent control being performed, the vehicle speed is higher than or equal to the predetermined vehicle speed, the required power is larger than or equal to the predetermine power and the engine speed exceeds the resonance band, the engine speed, which increases as the vehicle speed increases, is set as the target engine speed and the engine input torque determined depending on the required power is set as the target engine input torque.

Furthermore, in the engine operation start control during the intermittent control being performed according to the second embodiment, the threshold value of the vehicle speed used as the condition for setting the engine speed determined depending to the vehicle speed as the target engine speed (that is, the aforementioned predetermined vehicle speed) may be different from that used as the condition for setting the engine input torque determined depending on the required power as the target engine input torque and the threshold value of the required power used as the condition for setting the engine speed determined depending on the vehicle speed as the target engine speed (that is, the aforementioned predetermined power) may be different from that used as the condition for setting the engine input torque determined depending on the required power as the target engine input torque.

Further, in the engine operation start control during the intermittent control being performed according to the aforementioned embodiments, in case that the vehicle speed is zero when the engine operation start is required, a predetermined constant engine speed independently of the vehicle speed may be set as the target engine speed and the engine input torque determined depending on the engine water temperature and independently of the required power may be set as the target engine input torque.

Furthermore, the aforementioned embodiments are those in which the invention is applied to a case that the torque output from the first motor generator is used as the engine input torque. However, the invention can be broadly applied to a case that the torque output from a device other than the first motor generator is used as the engine input torque.

Further, in the aforementioned embodiments, while the engine operation is stopped during the intermittent control being performed, the engine speed may be maintained at zero or generally zero. In this case, while the engine operation is stopped, the power of the first motor generator or the second motor generator is not consumed for idling the engine along with the friction loss and therefore, the unnecessary consumption of the electric power of the battery is suppressed.

Figure 4:
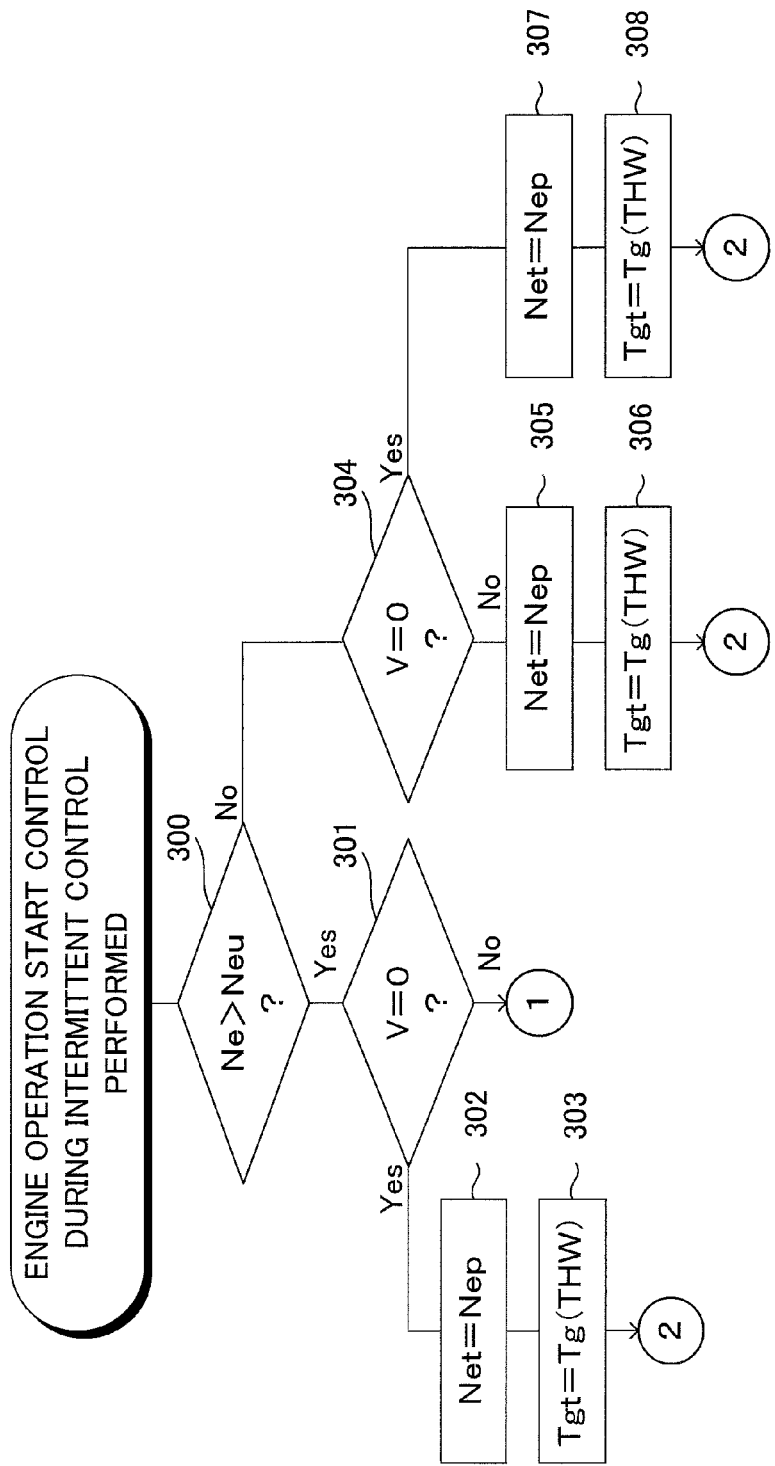
FIG. 4 is a view showing a part of an example of a routine for performing the engine operation start control during the intermittent control being performed according to the embodiment of the invention.
Figure 5:
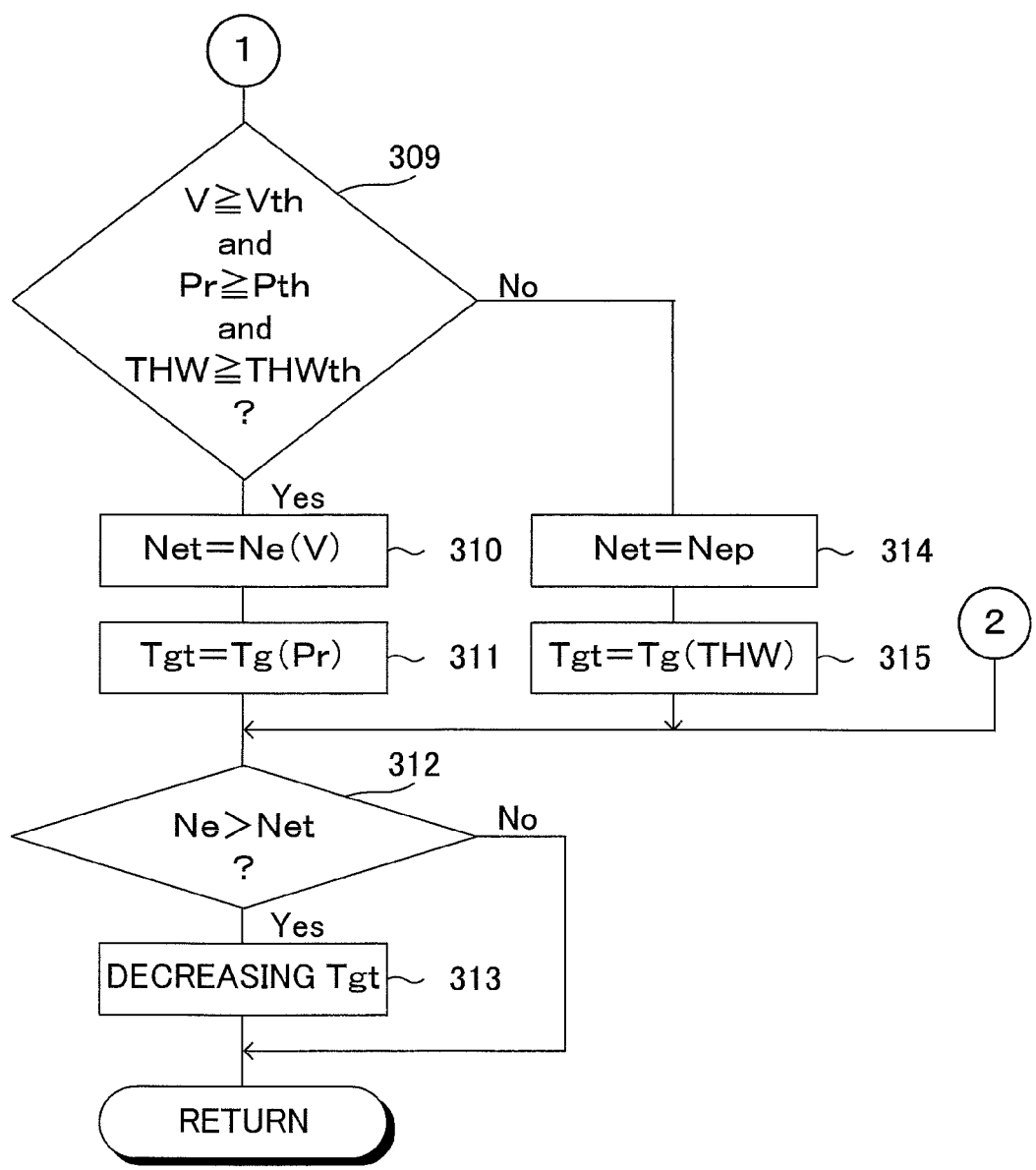
FIG. 5 is a view showing a part of an example of a routine for performing the engine operation start control during the intermittent control being performed according to the embodiment of the invention.

Next, an example of a routine for performing the engine operation start control during the intermittent control being performed according to the aforementioned embodiments of the invention will be described. This example of the routine is shown in FIGS. 4 and 5. It should be noted that this routine starts when the engine operation start is required during the intermittent control being performed and thereafter, is repeatedly performed at predetermined time intervals until the cranking of the engine is completed (that is, until the engine input torque becomes zero).

When the routine of FIG. 4 starts, first, at step 300, it is judged if the engine speed Ne is higher than the upper limit value Neu of the resonance band (Ne>Neu). In this regard, when it is judged that Ne>Neu, the routine proceeds to the step 301. On the other hand, when it is not judged that Ne>Neu, the routine proceeds to the step 304.

At the step 301, it is judged if the vehicle speed V is zero (V=0). In this regard, when it is judged that V=0, the routine proceed to the step 302. On the other hand, when it is not judged that V=0, the routine proceeds to the step 309.

At the step 302, a predetermined constant engine speed Nep is set as the target engine speed Net. Next, at the step 303, the engine input torque Tg(THW) determined depending on the engine water temperature THW is set as the target engine input torque Tgt and then, the routine proceeds to the step 312. It should be noted that at the step 303, for example, the engine input torque depending on the engine water temperature is determined by using a map, which is previously prepared in the form of a function of the engine water temperature and the engine input torque for determining an appropriate engine input torque depending on the engine water temperature when the engine speed exceeds the resonance band and the vehicle speed is zero.

At the step 304, it is judged if the vehicle speed V is zero (V=0). In this regard, when it is judged that V=0, the routine proceeds to the step 307. On the other hand, when it is not judged that V=0, the routine proceeds to the step 305.

At the step 305, the predetermined constant engine speed Nep is set as the target engine speed Net. Next, at the step 306, the engine input torque Tg(THW) determined depending on the engine water temperature THW is set as the target engine input torque Tgt and then, the routine proceeds to the step 312. It should be noted that at the step 306, for example, the engine input torque depending on the engine water temperature is determined by using a map, which is previously prepared in the form of a function of the engine water temperature and the engine input torque for determining an appropriate engine input torque depending on the engine water temperature when the engine speed does not exceed the resonance band and the vehicle speed is not zero.

At the step 307, the predetermined constant engine speed Nep is set as the target engine speed Net. Next, at the step 308, the engine input torque Tg(THW) determined depending on the engine water temperature THW is set as the target engine input torque Tgt and then, the routine proceeds to the step 312. It should be noted that at the step 308, for example, the engine input torque depending on the engine water temperature is determined by using a map, which is previously prepared in the form of a function of the engine water temperature and the engine input torque for determining an appropriate engine input torque depending on the engine water temperature when the engine speed does not exceed the resonance band and the vehicle speed is zero.

At the step 309, it is judged if the vehicle speed V is higher than or equal to a predetermined vehicle speed Vth (V≥Vth), the required power Pr is larger than or equal to a predetermined power Pth (Pr≥Pth) and the engine water temperature THW is higher than or equal to a predetermined water temperature THWth (THW≥THWth). In this regard, when it is judged that V≥Vth, Pr≥Pth and THW≥THWth, the routine proceeds to the step 310. On the other hand, when it is not judged that V≥Vth, Pr≥Pth and THW≥THWth, the routine proceeds to the step 314.

At the step 310, the engine speed Ne(V) determined depending on the vehicle speed V is set as the target engine speed Net. Next, at the step 311, the engine input torque Tg(Pr) determined depending on the required power Pr is set as the target engine input torque Tgt and then, the routine proceeds to the step 312.

At the step 314, the predetermined constant engine speed Nep is set as the target engine speed Net. Next, at the step 315, the engine input torque Tg(THW) determined depending on the engine water temperature THW is set as the target engine input torque Tgt and then, the routine proceeds to the step 312. It should be noted that at the step 315, for example, the engine input torque depending on the engine water temperature is determined by using a map, which is previously prepared in the form of a function of the engine water temperature and the engine input torque for determining an appropriate engine input torque depending on the engine water temperature when the engine speed does not exceed the resonance band, the vehicle speed is not zero and the vehicle speed is not higher than or equal to the predetermined vehicle speed or the required power is not larger than or equal to the predetermined power or the engine water temperature is not higher than or equal to the predetermined water temperature.

At the step 312, it is judged if the engine speed Ne is higher than the target engine speed Net (Ne>Net). In this regard, when it is judged that Ne>Net, the routine proceeds to the step 313 where the target engine input torque Tgt is decreased by a constant value and thereafter, the routine ends.

Figure 6:
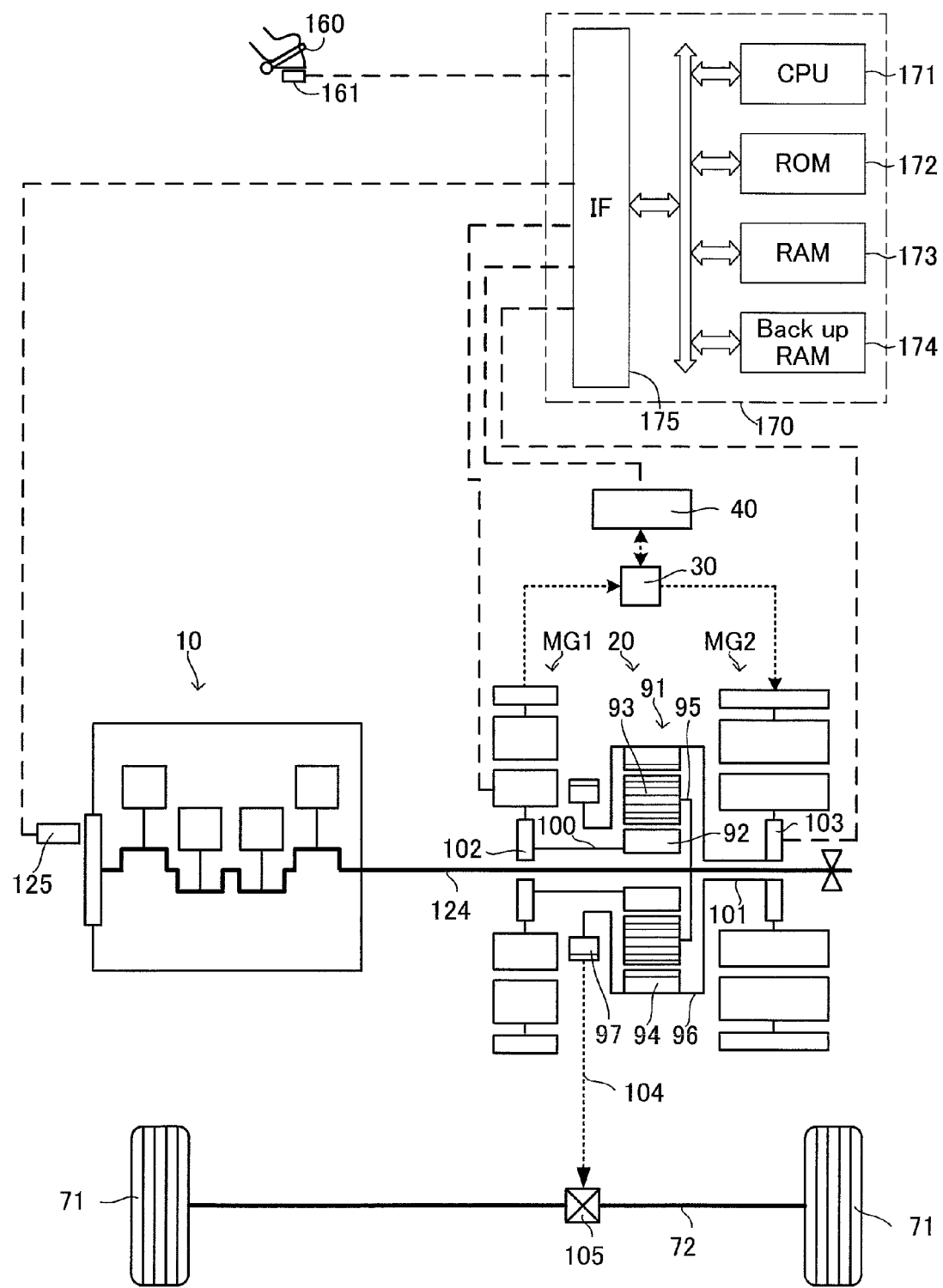
FIG. 6 is a view showing an example of a power output device according to the embodiment of the invention.

Next, an example of the power output device which may be employed in the aforementioned embodiments will be described. This example of the power output device is shown in FIG. 6. In FIG. 6, MG1 denotes the first motor generator, MG2 denotes the second motor generator, 10 denotes the engine, 20 denotes the power distribution device, 30 denotes the inverter, 40 denotes the battery, 71 denotes the drive wheels, 72 denotes the drive shaft, 115 denotes the crank shaft (that is, the engine output shaft), 124 denotes the crank angle sensor, 160 denotes the acceleration pedal, 161 denotes the acceleration pedal depression degree sensor and 170 denotes the electronic control device.

The power distribution device 20 has the planetary gear device 91. The planetary gear device 91 has the sun gear 91, the planetary gears 93 and the ring gear 94. The planetary gears 93 mesh with the sun gear 92 and the ring gear 94. The sun gear 92 is connected to a shaft 61 of the first motor generator MG1 (hereinafter, this shaft will be referred to as "first shaft"). Therefore, the first motor generator MG1 can be rotationally driven by the torque input from the sun gear 92 to the first motor generator MG1 and can output the torque to the sun gear 92. Then, the first motor generator MG1 can generate an electric power by being rotationally driven by the torque input from the sun gear 92 to the first motor generator MG1. The ring gear 94 is connected to a shaft 62 of the second motor generator MG2 via a ring gear carrier 96 (hereinafter, this shaft will be referred to as "second shaft"). Therefore, the second motor generator MG2 can output the torque to the ring gear 94 and can be rotationally driven by the torque input from the ring gear 94 to the second motor generator MG2. Then, the second motor generator MG2 can generate an electric power by being rotationally driven by the torque input from the ring gear 94 to the second motor generator MG2.

The planetary gears 93 are connected to the engine output shaft 124 via a planetary gear carrier 95. Therefore, the planetary gears 93 are rotationally driven by the torque input from the engine output shaft 124 to the planetary gears 93. Further, the planetary gears 93 mesh with the sun and ring gears 92 and 94. Therefore, when a torque is input from the planetary gears 93 to the sun gear 92, the sun gear 92 is rotationally driven by this torque and when a torque is input from the planetary gears 93 to the ring gear 94, the ring gear 94 is rotationally driven by this torque. On the other hand, when a torque is input from the sun gear 92 to the planetary gears 93, the planetary gears 93 are rotationally driven by this torque and when a torque is input from the ring gear 94 to the planetary gears 93, the planetary gears 93 are rotationally driven by this torque.

The ring gear 94 is connected to the output gear 97 via a ring gear carrier 96. Therefore, the output gear 97 is rotationally driven by the torque input from the ring gear 94 to the output gear 97 and the ring gear 94 is rotationally driven by the torque input from the output gear 97 to the ring gear 94.

Further, the first motor generator MG1 has a resolver 102. The resolver 102 is connected to the interface 175 of the electronic control device 170. The resolver 102 outputs an output value corresponding to the rotation angle of the first motor generator MG1. This output value is input to the electronic control device 170. The electronic control device 170 calculates a rotation speed of the first motor generator (hereinafter, this rotation speed will be referred to as "first MG rotation speed") on the basis of the output value. On the other hand, the second motor generator MG2 has a resolver 103. The resolver 103 is connected to the interface 175 of the electronic control device 170. The resolver 103 outputs an output value corresponding to the rotation angle of the second motor generator MG2. This output value is input to the electronic control device 170. The electronic control device 170 calculates a rotation speed of the second motor generator (hereinafter, this rotation speed will be referred to as "second MG rotation speed") on the basis of the output value.

Further, the first motor generator MG1 is electrically connected to the battery 40 via the inverter 30. Therefore, when the first motor generator MG1 generates an electric power, the electric power generated by the first motor generator MG1 (hereinafter, this electric power will be referred to as "first generated electric power") can be supplied to the battery 40 via the inverter 30. Further, the first motor generator MG1 can be rotationally driven by the electric power supplied from the battery 40 and is configured such that its rotation speed can be controlled by controlling a control torque applied to the first motor generator MG1 by the electric power supplied from the battery 40 (hereinafter, this control torque will be referred to as "first control torque").

Further, the second motor generator MG2 is electrically connected to the battery 40 via the inverter 30. Therefore, the second motor generator MG2 can be rotationally driven by the electric power supplied from the battery 40 and is configured such that its rotation speed can be controlled by controlling a control torque applied to the second motor generator MG2 by the electric power supplied from the battery 40 (hereinafter, this control torque will be referred to as "second control torque"). Further, when the second motor generator MG2 generates an electric power, the electric power generated by the second motor generator MG2 (hereinafter, this electric power will be referred to as "second generated electric power") can be supplied to the battery 40 via the inverter 30. It should be noted that the first generated electric power can be supplied directly to the second motor generator MG2 and the second generated electric power can be supplied directly to the first motor generator MG1.

Further, the battery 40 is connected to the interface 175 of the electronic control device 170. Then, information relating to the battery electric power storage amount (that is, the amount of the electric power stored in the battery 40) is input to the interface 175 of the electronic control device 170. Furthermore, the inverter 30 is connected to the interface 175 of the electronic control device 170. Then, the electric power amounts supplied from the inverter 30 to the second motor generator MG2 and supplied from the inverter 30 to the first motor generator MG1 are controlled by a command sent from the electronic control device 170 through the interface 175.

Further, the output gear 97 is connected to a differential gear 105 via a gear train 104. The differential gear 105 is mounted on the drive shaft 106. The drive wheels 71 are mounted on either end of the drive shaft 106. Therefore, the torque from the output gear 97 is transmitted to the drive wheels 71 via the gear train 104, the differential gear 105 and the drive shaft 106.

It should be noted that the required power is calculated on the basis of the depression amount of the acceleration pedal and the vehicle speed. Further, the power to be output from the engine of the required power is calculated as a required engine power. Then, an engine operation points, in which the fuel consumption is lowest when the required engine power is output from the engine output shaft, are previously obtained every the required engine power by an experiment, etc. as optimal engine operation point. A line formed by plotting the optimal engine operation points on a graph defined by the engine torque and the engine speed and connecting the plotted optimal engine operation points is obtained as an optimal engine operation line. This optimal engine operation line is memorized in the electronic control device. Then, while the engine is operated, the required engine power is calculated and the engine operation point on the optimal engine operation line, which can output the calculated required engine power from the engine, is selected. The engine torque and the engine speed defining this selected engine operation point are set as the target engine torque and the target engine speed, respectively. Then, the fuel injection amount (that is, the amount of the fuel injected from the fuel injector of the engine) and the engine speed are controlled such that the set target engine torque and the set target engine speed are accomplished.

Further, in case that the required engine power calculated during the engine being operated is zero, the engine operation is stopped and the required output is output from the power output device only by the output(s) from the first motor generator and/or the second motor generator.

In case that the second MG rotation speed is constant, when the first MG rotation speed changes, the engine speed also changes. In other words, the engine speed can be controlled by controlling the first MG rotation speed. Then, when expressing the first MG rotation speed by "NM1", the second MG rotation speed by "NM2", the engine speed by "NE" and the ratio of the number of the teeth of the sun gear relative to that of the ring gear (that is, (the number of the teeth of the sun gear)/(the number of the teeth of the ring gear)) by "$\rho$", the relationship indicated by the following formula 1 is established between the first MG rotation speed and the engine speed. Therefore, when expressing the target first MG rotation speed by "NM1t" and the target engine speed by "NEt", the relationship indicated by the following formula 2 is established between the target first MG rotation speed and the target engine speed.

$$NM1=(NE-NM2)/\rho+NE \quad (1)$$

$$NM1t=(NEt-NM2)/\rho+NEt \quad (2)$$

The target first MG rotation speed Nm1t is calculated from the formula 2 by using the present second MG rotation speed NM2 and the target engine speed NEt set according to the engine operation point selected depending on the required output. Then, the difference of the present first MG rotation speed NM1 relative to the thus calculated target first MG rotation speed NM1t (=NM1t−NM1) is calculated. Then, the first control torque is controlled such that this calculated difference becomes zero.

When expressing the engine torque by "TQE", the engine torque input to the ring gear (that is, the drive wheels) (hereinafter, this engine torque will be referred to as "ring gear input engine torque") by "TQEr" and the ratio of the number of the teeth of the sun gear relative to that of the ring gear (that is, (the number of the teeth of the sun gear)/(the number of the teeth of the ring gear)) by "$\rho$", the relationship indicated by the following formula 3 is established between the ring gear input engine torque and the engine torque.

$$TQEr=1/(1+\rho)*TQE \quad (3)$$

That is, the ring gear input engine torque TQEr is a part of the engine torque TQE. Therefore, the ring gear input engine torque TQEr is smaller than the required drive torque (that is, the torque to be input to the drive wheels 71). According to the first embodiment, the second control torque is controlled such that the torque corresponding to the difference between the required drive torque and the ring gear input engine torque TQEr is input from the second motor generator to the ring gear. According to this, the torque equal to the required drive torque is input to the ring gear.

It should be noted that in the hybrid vehicle shown in FIG. 6, the engine speed can be increased by changing the rotation speed of the first motor generator. In this regard, in the engine operation start during the intermittent control being performed, the change degree of the rotation speed of the first motor generator may be suppressed to a constant degree when the engine is cranked. In this case, it is suppressed that the electric power of the battery is unnecessarily consumed for changing the rotation speed of the first motor generator.

The invention claimed is:

1. An engine operation start control device of a hybrid vehicle comprising a power output device having an internal combustion engine and an electric motor, the control device being able to perform an intermittent control for intermittently operating the engine and perform a cranking of the engine until an engine speed reaches a target engine speed when the control device starts the operation of the engine during the intermittent control being performed, wherein in case that the device starts the operation of the engine when a speed of the hybrid vehicle is higher than or equal to a predetermined speed and a power required for the power output device is larger than or equal to a predetermined power during the intermittent control being performed, the control device sets the engine speed, which increases as the speed of the hybrid vehicle increases, as the target engine speed, and wherein when the predetermined speed is referred to as first speed and the predetermined power is referred to as first power, in case that the control device starts the operation of the engine when the speed of the hybrid vehicle is higher than or equal to a predetermined second speed and the power required for the power output device is larger than or equal to a predetermined second power during the intermittent control being performed, the control device controls a torque input to an output shaft of the engine for cranking the engine, depending on the required power.

2. The engine operation start control device of the hybrid vehicle as set forth in claim 1, wherein the torque applied to the output shaft of the engine for cranking the engine is a torque output from the electric motor.

3. The engine operation start control device of the hybrid vehicle as set forth in claim 1, wherein after the engine speed becomes higher than the target engine speed when the control device starts the operation of the engine during the intermittent control being performed, the control device gradually decreases the torque applied to the output shaft of the engine for cranking the engine.

4. The engine operation start control device of the hybrid vehicle as set forth in claim 1, wherein when the operation of the engine is stopped during the intermittent control being performed, the control device maintains the engine speed at zero or generally zero.

* * * * *